12) United States Patent
Xu

(10) Patent No.: US 12,185,070 B2
(45) Date of Patent: Dec. 31, 2024

(54) AUDIO PLAYING APPARATUS, AUDIO PLAYING METHOD, AND ELECTRONIC DEVICE

(71) Applicant: VIVO MOBILE COMMUNICATION CO., LTD., Dongguan (CN)

(72) Inventor: Mingjun Xu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 200 days.

(21) Appl. No.: 17/894,133

(22) Filed: Aug. 23, 2022

(65) Prior Publication Data

US 2022/0408190 A1 Dec. 22, 2022

Related U.S. Application Data

(63) Continuation of application No. PCT/CN2021/077040, filed on Feb. 20, 2021.

(30) Foreign Application Priority Data

Feb. 27, 2020 (CN) .................. 202010123638.X

(51) Int. Cl.
H04R 5/033 (2006.01)
H04M 1/19 (2006.01)
(Continued)

(52) U.S. Cl.
CPC ............. H04R 5/033 (2013.01); H04R 3/005 (2013.01)

(58) Field of Classification Search
None
See application file for complete search history.

(56) References Cited

U.S. PATENT DOCUMENTS

2013/0044887 A1* 2/2013 Dong ............... H04R 29/00
381/59
2014/0307888 A1* 10/2014 Alderson ......... G10K 11/17837
381/71.8

FOREIGN PATENT DOCUMENTS

CN 201328172 Y 10/2009
CN 201601696 U 10/2010
(Continued)

OTHER PUBLICATIONS

Xu, Xiaolin. CN106954137A Dual-mode drive device for loudspeaker. English translation provided by EPO. (Year: 2017).*
(Continued)

Primary Examiner — Qin Zhu
(74) Attorney, Agent, or Firm — IPX PLLC

(57) ABSTRACT

An audio playing apparatus, an audio playing method, and an electronic device are provided. The audio playing apparatus includes: a power amplifier module; a switch, where an input end of the switch is connected to the power amplifier module; a first noise suppression component and a second noise suppression component, where the first noise suppression component is connected to a first output end of the switch, and the second noise suppression component is connected to a second output end of the switch; and a speaker module, connected to the first noise suppression component and the second noise suppression component. In a case that the speaker module is separately in a receiver mode and a speaker mode, the input end of the switch is separately connected to the first output end and the second output end of the switch.

7 Claims, 3 Drawing Sheets

(51) Int. Cl.
*H04M 1/58* (2006.01)
*H04M 1/60* (2006.01)
*H04M 1/72442* (2021.01)
*H04R 3/00* (2006.01)
*H04R 5/04* (2006.01)

(56) References Cited

FOREIGN PATENT DOCUMENTS

| CN | 101945146 A | 1/2011 |
|---|---|---|
| CN | 102325288 A | 1/2012 |
| CN | 202261181 U | 5/2012 |
| CN | 202617106 U | 12/2012 |
| CN | 102970396 A | 3/2013 |
| CN | 106060711 A | 10/2016 |
| CN | 205812113 U | 12/2016 |
| CN | 106792366 A | 5/2017 |
| CN | 106954137 A | 7/2017 |
| CN | 111225315 A | 6/2020 |
| CN | 213880252 U | 8/2021 |
| EP | 0871312 A1 | 10/1998 |

OTHER PUBLICATIONS

International Search Report issued in corresponding International Application No. PCT/CN2021/077040, mailed May 19, 2021, 5 pages.
First Office Action issued in related Chinese Application No. 202010123638.X, mailed Feb. 20, 2021, 8 pages.
Second Office Action issued in related Chinese Application No. 202010123638.X, mailed Sep. 10, 2021, 7 pages.
Extended European Search Report issued in related European Application No. 21760097.2, mailed Jul. 11, 2023, 7 pages.

* cited by examiner

AUDIO PLAYING APPARATUS, AUDIO PLAYING METHOD, AND ELECTRONIC DEVICE

CROSS-REFERENCE TO RELATED APPLICATIONS

This application is a continuation of International Application No. PCT/CN2021/077040, filed on Feb. 20, 2021, which claims priority to Chinese Patent Application No. 202010123638.X, filed on Feb. 27, 2020. The entire contents of each of the above-identified applications are expressly incorporated herein by reference.

TECHNICAL FIELD

The present disclosure relates to the field of communications technologies, and in particular, to an audio playing apparatus, an audio playing method, and an electronic device.

BACKGROUND

With the development of multimedia technologies, an electronic device has dual speakers, and plays audio by using the dual speakers, so that not volume is turned up, but a stereo field can also be formed.

In a related technology, dual speakers need to be provided with two intelligent power amplifiers, one is configured to drive a conventional speaker, and the other is configured to drive a two-in-one speaker. The two-in-one speaker includes two operating modes: a speaker mode and a receiver mode. When the two-in-one speaker is in the speaker mode, high volume is required, an output voltage of an intelligent power amplifier corresponding to the two-in-one speaker is high, and a current on a channel is large. When the two-in-one speaker is in the receiver mode, no excessively high volume is required, the output voltage of the intelligent power amplifier is low, and the current on the channel is small.

The two-in-one speaker is close to an antenna radiation position, and is therefore susceptible to interference from an antenna signal. When the two-in-one speaker is in the speaker mode, a corresponding intelligent power amplifier outputs a Pulse Width Modulation (PWM) wave. In this case, a boost voltage is high, and radio frequency receive performance is significantly affected. When the two-in-one speaker is in the receiver mode, in a Global System for Mobile Communications (GSM) call scenario, antenna radiation also easily interferes with an audio channel.

It can be learned that in the existing technology, when the two-in-one speaker and a radio frequency module work at the same time, there is a problem of mutual interference.

SUMMARY

Embodiments of the present disclosure provide an audio playing apparatus, an audio playing method, and an electronic device.

According to a first aspect, an embodiment of the present disclosure provides an audio playing apparatus, including:
  a power amplifier module;
  a switch, where an input end of the switch is connected to the power amplifier module;
  a first noise suppression component and a second noise suppression component, where a first end of the first noise suppression component is connected to a first output end of the switch, and a first end of the second noise suppression component is connected to a second output end of the switch; and
  a speaker module, connected to a second end of the first noise suppression component and a second end of the second noise suppression component, where the speaker module has a receiver mode and a speaker mode; where
  in a case that the speaker module is in the receiver mode, the input end of the switch is connected to the first output end of the switch, and an operating parameter of the first noise suppression component matches a first output current of the power amplifier module; and
  in a case that the speaker module is in the speaker mode, the input end of the switch is connected to the second output end of the switch, and an operating parameter of the second noise suppression component matches a second output current of the power amplifier module.

According to a second aspect, an embodiment of the present disclosure further provides an audio playing method, applied to an electronic device, where the electronic device includes the foregoing audio playing apparatus, and the method includes:
  receiving a first input; and
  in response to the first input, switching the speaker module to the receiver mode, and connecting the input end of the switch to the first output end; or
  in response to the first input, switching the speaker module to the speaker mode, and connecting the input end of the switch to the second output end.

According to a third aspect, an embodiment of the present disclosure further provides an electronic device, including the foregoing audio playing apparatus, where the electronic device further includes:
  a receiving module, configured to receive a first input; and
  a control module, configured to: in response to the first input, switch the speaker module to the receiver mode, and connect the input end of the switch to the first output end; or
  in response to the first input, switch the speaker module to the speaker mode, and connect the input end of the switch to the second output end.

According to a fourth aspect, an embodiment of the present disclosure further provides an electronic terminal device, including a memory, a processor, and a computer program that is stored in the memory and that can run on the processor, where when the computer program is executed by the processor, steps in the foregoing audio playing method are implemented.

According to a fifth aspect, an embodiment of the present disclosure further provides a computer-readable storage medium, where the computer-readable storage medium stores a computer program, and when the computer program is executed by a processor, steps in the foregoing audio playing method are implemented.

In embodiments of the present disclosure, the audio playing apparatus includes: a power amplifier module; a switch, where an input end of the switch is connected to the power amplifier module; a first noise suppression component and a second noise suppression component, where a first end of the first noise suppression component is connected to a first output end of the switch, and a first end of the second noise suppression component is connected to a second output end of the switch; and a speaker module, connected to a second end of the first noise suppression component and a second end of the second noise suppression component, where the speaker module has a receiver mode and a speaker mode. In a case that the speaker module is in the receiver mode, the input end of the switch is connected to the first output end of the switch, and an operating parameter of the first noise suppression component matches a first output current of the power amplifier module. In a case that the speaker module is in the speaker mode, the input end of the switch is connected to the second output end of the switch, and an operating parameter of the second noise suppression component matches a second output current of the power amplifier module. In this way, in a case that the speaker module is in the receiver mode, the speaker module may be connected to the first noise suppression component by using the switch, and in a case that the speaker module is in the speaker mode, the speaker module may be connected to the second noise suppression component by using the switch, thereby avoiding mutual interference between the speaker module and the electronic device when the speaker module is in different operating modes.

BRIEF DESCRIPTION OF DRAWINGS

The following briefly describes the accompanying drawings of the present disclosure. Apparently, the accompanying drawings in the following description show merely some embodiments of the present disclosure, and a person of ordinary skill in the art may still derive other drawings from these accompanying drawings without creative efforts.

DETAILED DESCRIPTION

The following describes the technical solutions in the embodiments of the present disclosure with reference to the accompanying drawings in the embodiments of the present disclosure. Apparently, the described embodiments are some rather than all of the embodiments of the present disclosure. Based on the embodiments of the present disclosure, all other embodiments obtained by a person of ordinary skill in the art without creative efforts fall within the protection scope of the present disclosure.

Figure 1:
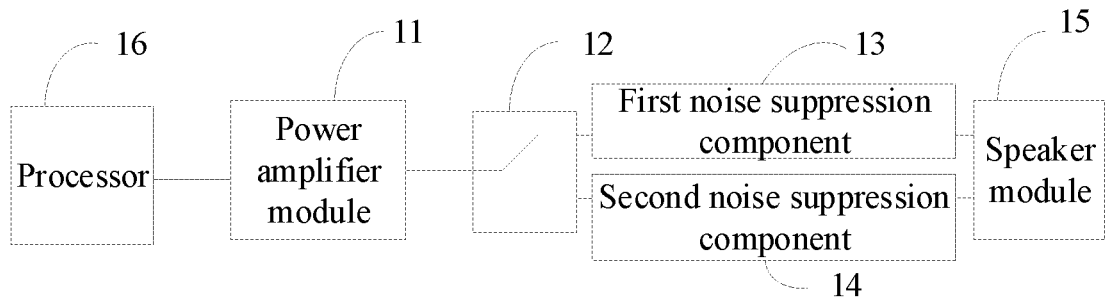
FIG. 1 is a first structural diagram of an audio playing apparatus according to an embodiment of the present disclosure.

FIG. 1 is a structural diagram of an audio playing apparatus according to an embodiment of the present disclosure. As shown in FIG. 1, the audio playing apparatus includes:

a power amplifier module 11;
a switch 12, where an input end of the switch 12 is connected to the power amplifier module 11;
a first noise suppression component 13 and a second noise suppression component 14, where a first end of the first noise suppression component 13 is connected to a first output end of the switch 12, and a first end of the second noise suppression component 14 is connected to a second output end of the switch 12; and
a speaker module 15, connected to a second end of the first noise suppression component 13 and a second end of the second noise suppression component 14, where the speaker module 15 has a receiver mode and a speaker mode.

In a case that the speaker module 15 is in the receiver mode, the input end of the switch 12 is connected to the first output end of the switch 12, and an operating parameter of the first noise suppression component 13 matches a first output current of the power amplifier module 11.

In a case that the speaker module 15 is in the speaker mode, the input end of the switch 12 is connected to the second output end of the switch 12, and an operating parameter of the second noise suppression component 14 matches a second output current of the power amplifier module 11.

The switch 12 includes one input end and two output ends, and the input end of the switch 12 may be connected to the first output end or the second output end. The speaker module 15 may be a two-in-one speaker in any related technology. The speaker module 15 can be used for stereo playback, that is, a speaker mode, and can also make a sound during a call in a handheld mode, that is, a receiver mode.

When the speaker module 15 works in the receiver mode, the input end of the switch 12 may be connected to the first output end, and the input end and the first output end may be connected through control in a manual operation manner or intelligent control of the electronic device. In this case, the power amplifier module 11, the first noise suppression component 13, and the speaker module 15 form a channel In the receiver mode, no excessively high volume is required. Therefore, in this case, an output voltage of the power amplifier module 11 is low, and overcurrent on an output channel is relatively small. A main function of the first noise suppression component 13 is to suppress current noise interference of Time Division Duplex (TDD) in GSM. An operating parameter that matches the overcurrent on the current channel may be selected as the operating parameter of the first noise suppression component 13. In other words, a current noise suppression effect of the operating parameter of the first noise suppression component is better, and an overcurrent capability can meet a current requirement of the output channel. The first noise suppression component may be a magnetic bead, an inductor, or another component configured to suppress noise. For example, operating parameters of the first noise suppression component could be as follows: impedance at 900 MHz is more than 1 k$\Omega$, and an overcurrent capability is more than 0.6 A.

When the speaker module 15 works in the speaker mode, the input end of the switch 12 may be connected to the second output end, and the input end and the second output end may be connected through control in a manual operation manner or intelligent control of the electronic device. In this case, the power amplifier module 11, the second noise suppression component 14, and the speaker module 15 form a channel In the speaker mode, a relatively high volume is required. In this case, a voltage of the power amplifier module 11 is boosted, an output voltage is relatively high, and a current on an output channel is relatively large. In this case, an interference requirement on TDD current noise is relatively low, because the user's ear does not approach a speaker in the speaker mode. The operating parameter of the second noise suppression component 14 may match an overcurrent parameter on the current channel, and an overcurrent capability of the second noise suppression component can meet a current requirement of the output channel. The second noise suppression component may also be a magnetic bead, an inductor, or another component configured to suppress noise. The first noise suppression component and the second noise suppression component may be components of a same or different types. For example, operating parameters of the second noise suppression component could be as follows: an overcurrent capability is greater than 1.5 A, and impedance at 900 MHz is approximately 100Ω.

In this way, when the speaker module 15 is in the receiver mode and the speaker mode, the first noise suppression component 13 and the second noise suppression component 14 may be respectively used. Therefore, both a requirement for resisting TDD current noise in the receiver mode and a requirement for the overcurrent capability in the speaker mode are taken into account.

In some embodiments, impedance of the first noise suppression component 13 is greater than or equal to a preset impedance value, and an overcurrent capability of the first noise suppression component 13 is less than a preset current value; and impedance of the second noise suppression component 14 is less than the preset impedance value, and an overcurrent capability of the second noise suppression component 14 is greater than or equal to the preset current value.

In this embodiment, no excessively high volume is required in the receiver mode. Therefore, an output voltage of the power amplifier module 11 is relatively low, and overcurrent on an output channel is relatively small. A main function of the first noise suppression component 13 is to suppress TDD interference in GSM, and a noise suppression component with relatively large impedance and a relatively small overcurrent capability may be selected, and the overcurrent capability of the first noise suppression component can meet an overcurrent value on the output channel.

In the speaker mode, an output voltage of the power amplifier module 11 is relatively high, and an overcurrent on the output channel is relatively large. An overcurrent capability of the second noise suppression component 14 is relatively large, an impedance value is relatively low, and the overcurrent capability of the second noise suppression component can meet the overcurrent requirement on the output channel.

A specific selected parameter value of the noise suppression component may be determined based on an actual requirement and an operating parameter of a circuit in an operating mode in which the speaker module is located.

Because the operating parameters of the first noise suppression component 13 and the second noise suppression component 14 are different, in different operating modes of the speaker module 15, different noise suppression components can meet requirements of the different operating modes, and a function and an effect of the noise suppression component can be improved.

Figure 2:
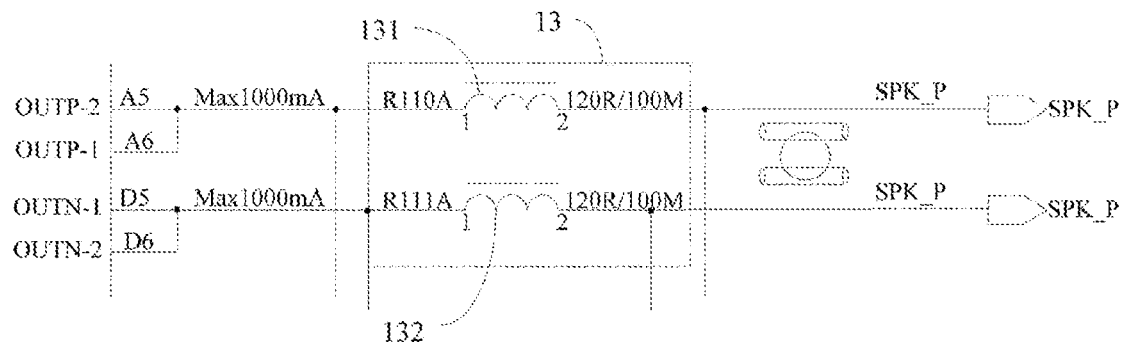
FIG. 2 is a second structural diagram of an audio playing apparatus according to an embodiment of the present disclosure.

In some embodiments, as shown in FIG. 2, the first noise suppression component 13 includes a first noise suppression sub-component 131 and a second noise suppression sub-component 132, a first end of the first noise suppression sub-component 131 is connected to the first output end of the switch 12, a second end of the first noise suppression sub-component 131 is connected to a positive electrode of the speaker module 15, a first end of the second noise suppression sub-component 132 is connected to the input end of the switch 12, and a second end of the second noise suppression sub-component 132 is connected to a negative electrode of the speaker module 15.

In this embodiment, for a circuit diagram of the first noise suppression component 13, reference may be made to FIG. 2.

When the noise suppression component shown in FIG. 2 is the first noise suppression component 13, the first noise suppression component 13 may include the first noise suppression sub-component 131 and the second noise suppression sub-component 132. The first noise suppression sub-component 131 and the second noise suppression sub-component 132 are respectively connected to the positive electrode and the negative electrode of the speaker module. For manners of connecting the first noise suppression sub-component and the second noise suppression sub-component, reference may be made to the existing technology.

In this embodiment, the power amplifier module may be connected to the first noise suppression component by using controlling a connection between the input end and the output end of the switch. The first noise suppression component includes the first noise suppression sub-component and the second noise suppression sub-component. When the power amplifier module is connected to the first noise suppression component by using the switch, a current channel can be formed between the first noise suppression sub-component and the second noise suppression sub-component, and an anti-current noise interference effect can be improved.

In some embodiments, the second noise suppression component 14 includes a third noise suppression sub-component and a fourth noise suppression sub-component, a first end of the third noise suppression sub-component is connected to the second output end of the switch 12, a second end of the third noise suppression sub-component is connected to the positive electrode of the speaker module 15, a first end of the fourth noise suppression sub-component is connected to the input end of the switch 12, and a second end of the fourth noise suppression sub-component is connected to the negative electrode of the speaker module 15.

In this embodiment, for a circuit diagram of the second noise suppression component 14, reference may also be made to FIG. 2. When the noise suppression component shown in FIG. 2 is the second noise suppression component 14, the first noise suppression component 13 may be replaced with the second noise suppression component 14, the first noise suppression sub-component 131 and the second noise suppression sub-component 132 may be respectively replaced with the third noise suppression sub-component and the fourth noise suppression sub-component, and the third noise suppression sub-component and the fourth noise suppression sub-component are respectively connected to the positive electrode and the negative electrode of the speaker module. For manners of connecting the third noise suppression sub-component and the fourth noise suppression sub-component, reference may be made to the existing technology.

In this embodiment, the power amplifier module may be connected to the second noise suppression component by using controlling a connection between the input end and the output end of the switch. The second noise suppression component includes the third noise suppression sub-component and the fourth noise suppression sub-component. When the power amplifier module is connected to the second noise suppression component by using the switch, a current channel can be formed between the third noise suppression sub-component and the fourth noise suppression sub-component, and an effect of the speaker can be improved.

Figure 3:
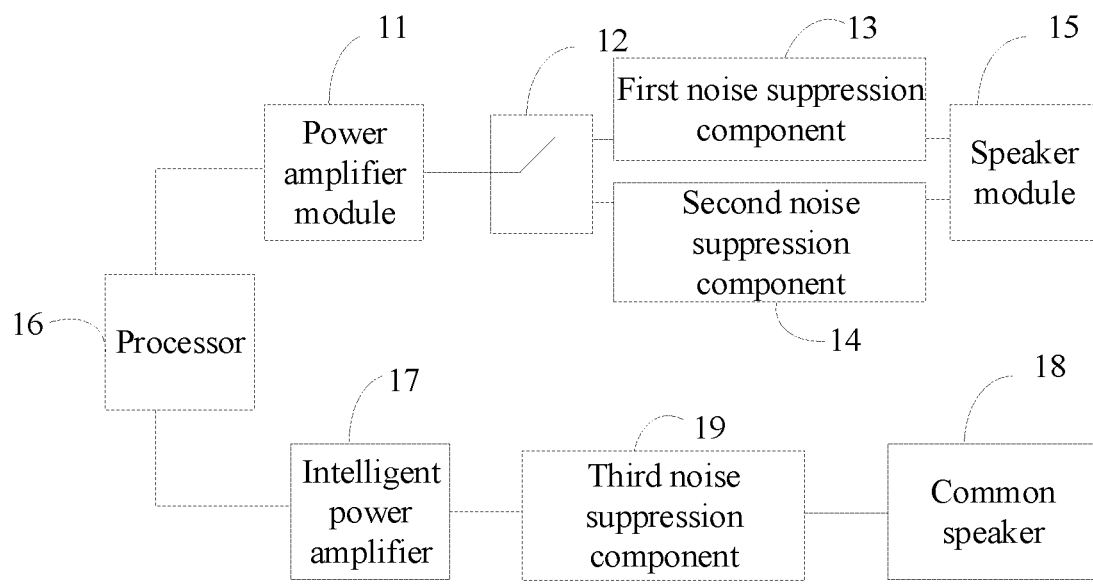
FIG. 3 is a third structural diagram of an audio playing apparatus according to an embodiment of the present disclosure.

In some embodiments, when the speaker module in the foregoing audio playing apparatus is a two-in-one speaker, as shown in FIG. 3, the apparatus further includes an intelligent power amplifier 17 and a common speaker 18, an input end of the intelligent power amplifier 17 is connected to the processor 16, and an output end of the intelligent power amplifier 17 is connected to the common speaker 18.

The processor 16 is further configured to control the intelligent power amplifier 17 to output a voltage to the common speaker 18, so that the intelligent power amplifier 17 drives the common speaker 18 to work.

In this embodiment, the audio playing apparatus includes the common speaker 18 and the intelligent power amplifier 17, where the common speaker 18 may be a module configured to implement a function of the common speaker. A third noise suppression component 19 may be added between the intelligent power amplifier 17 and the common speaker 18, to filter out mutual interference between an output channel of the intelligent power amplifier and a radio frequency antenna. For a circuit connection manner of the third noise suppression component, reference may also be made to FIG. 2. The processor 16 may control the intelligent power amplifier 17 to output a voltage to the common speaker 18, to drive the common speaker to work.

In this way, the processor 16 may control, based on a user operation, the speaker module 15 such as the two-in-one speaker or the common speaker 18 to work, to start different operating modes.

An embodiment of the present disclosure further provides an electronic device. The electronic device includes the audio playing apparatus in any one of the foregoing embodiments, and the electronic device has a beneficial effect in any one of the foregoing embodiments.

In some embodiments, the electronic device includes a processor 16, and the processor 16 is connected to the switch 12. The processor 16 is configured to:
  in a case that the speaker module 15 is in the receiver mode, control the input end of the switch 12 to connect to the first output end of the switch 12; and
  in a case that the speaker module 15 is in the speaker mode, control the input end of the switch 12 to connect to the second output end of the switch 12.

In this embodiment, the processor 16 is connected to the switch 12, and the processor 16 may detect an operating mode in which the speaker module 15 is located, to automatically control, based on the operating mode, a connection between the input end and the output end of the switch 12. For a connection circuit diagram of the processor 16 and the switch 12, reference may be made to FIG. 1.

In some embodiments, in a case that the processor 16 detects that the speaker module 15 is in the receiver mode, the processor 16 controls the input end of the switch 12 to be connected to the first output end, so that the power amplifier module 11 is connected to the first noise suppression component 13. The operating parameter of the first noise suppression component 13 matches a parameter on an output channel of the power amplifier module 11, and is mainly used to suppress noise interference, so that an effect of the speaker module can be improved.

In a case that the processor 16 detects that the speaker module 15 is in the speaker mode, the processor 16 controls the input end of the switch 12 to be connected to the second output end, so that the power amplifier module 11 is connected to the second noise suppression component 14. The operating parameter of the second noise suppression component 14 matches the parameter on the output channel of the power amplifier module 11, so that an effect of the speaker module can be improved.

In this way, the processor 16 may control the switch 12 to choose a noise suppression component based on the operating mode of the speaker module, so that an effect of the speaker module can be improved.

Figure 4:
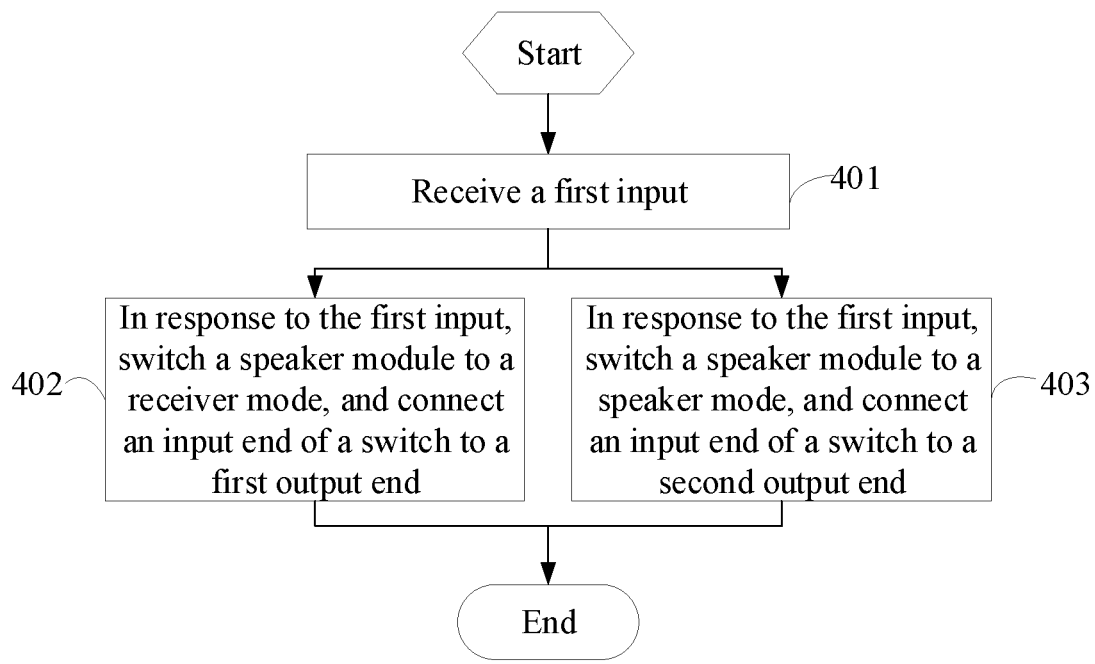
FIG. 4 is a first flowchart of an audio playing method according to an embodiment of the present disclosure.

Referring to FIG. 4, FIG. 4 is a flowchart of an audio playing method according to an embodiment of the present disclosure. The method is applied to an electronic device, and the electronic device includes the audio playing apparatus in the foregoing embodiments. The audio playing method includes:

Step 401: Receive a first input.

The user may operate the electronic device according to an actual requirement, that is, perform the first input. The first input may be an operation on a display, an operation on a physical key, a voice input, or the like, and this is not limited herein. The first input may be an operation of switching an operating mode or an initial operation of starting an operating mode, or may be an operation of starting a speaker module.

Step 402: In response to the first input, switch the speaker module to a receiver mode, and connect the input end of the switch to the first output end.

The operating mode of the speaker module may include a receiver mode and a speaker mode.

In this step, the electronic device may obtain, in response to the first input, an operating mode started by the speaker module or an operating mode selected by the first input. In a case that the speaker module is switched to the receiver mode, the electronic device may control the input end of the switch to be connected to the first output end of the switch, so that the power amplifier module is connected to the first noise suppression component. Because the operating parameter of the first noise suppression component matches a current parameter on a channel in a current mode, and the parameter of the first noise suppression component can better suppress interference from TDD current noise, thus the effect of the speaker module is improved.

Step 403: In response to the first input, switch the speaker module to a speaker mode, and connect the input end of the switch to the second output end.

In this step, a processor may obtain, in response to the first input, an operating mode started by the speaker module or an operating mode selected by the first input. In a case that the speaker module is switched to the speaker mode, the electronic device may control the input end of the switch to be connected to the second output end of the switch, so that the power amplifier module is connected to the second noise suppression component. Because the operating parameter of the second noise suppression component matches a current parameter on a channel in a current mode, thus the effect of the speaker can be improved.

In some embodiments, the method further includes:
  in a case that the first input instructs to control the speaker module to enable the receiver mode, controlling the input end of the switch to be connected to the first output end; and
  in a case that the first input instructs to control the speaker module to enable the speaker mode, controlling the input end of the switch to be connected to the second output end.

In this embodiment, the electronic device receives the first input, and may obtain the operating mode of the speaker module that is indicated by the first input, so that a connection between the input end of the switch and the output end may be controlled based on the operating mode indicated by the first input.

In this way, the processor can implement, based on an operation of a user, a connection to the noise suppression component by controlling the switch, so that the noise suppression component can meet a requirement of the operating mode of the speaker module, and an effect of the speaker module can be improved.

Figure 5:
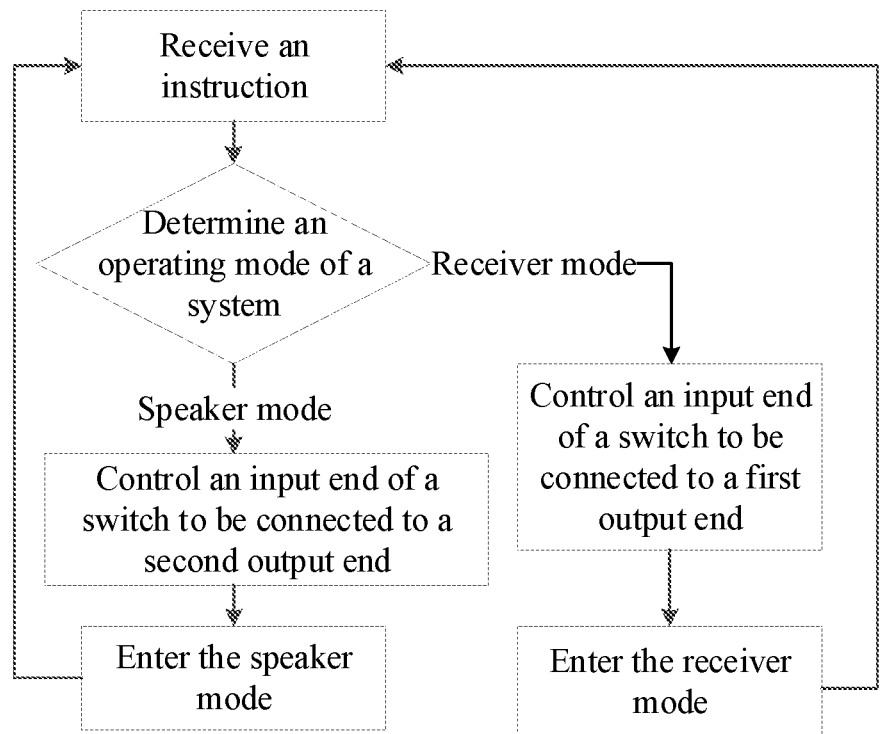
FIG. 5 is a second flowchart of an audio playing method according to an embodiment of the present disclosure.

For a procedure of this embodiment, reference may be made to FIG. 5. The electronic device receives an instruction of the user, that is, the first input, and determines the operating mode that needs to be enabled according to the instruction of the first input. In the speaker mode, the input end of the switch is controlled to be connected to the second output end, so that the power amplifier module is connected to the second noise suppression component, to enter a dual-speaker mode. In the receiver mode, the input end of the switch is controlled to be connected to the first output end, so that the power amplifier module is connected to the first noise suppression component, to enter the receiver mode.

In this embodiment of the present disclosure, the foregoing audio playing method may be applied to an electronic device, such as a mobile phone, a tablet personal computer, a laptop computer, a Personal Digital Assistant (PDA), a Mobile Internet Device (MID), or a wearable device.

In the audio playing method in this embodiment of the present disclosure, the first input is received; and in response to the first input, the speaker module is switched to the receiver mode, and the input end of the switch is connected to the first output end; or in response to the first input, the speaker module is switched to the speaker mode, and the input end of the switch is connected to the second output end. In this way, a connection to the noise suppression component may be implemented based on an operation of the user by controlling the switch, so that the noise suppression component can meet a requirement of the operating mode of the speaker module, and an effect of the speaker module can be improved.

Figure 6:
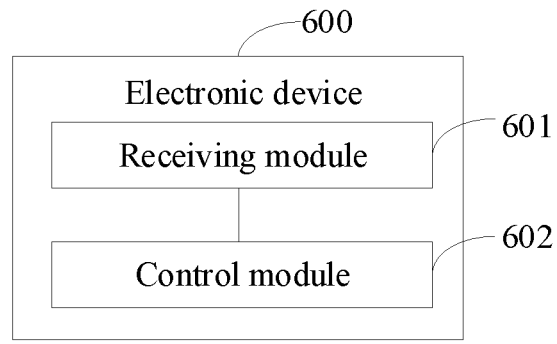
FIG. 6 is a first structural diagram of an electronic device according to an embodiment of the present disclosure.

FIG. 6 is a structural diagram of an electronic device according to an embodiment of the present disclosure. The electronic device includes the audio playing apparatus according to any one of the foregoing embodiments. As shown FIG. 6, an electronic device 600 includes:
a receiving module 601, configured to receive a first input; and
a control module 602, configured to: in response to the first input, switch the speaker module to the receiver mode, and connect the input end of the switch to the first output end; or
in response to the first input, switch the speaker module to the speaker mode, and connect the input end of the switch to the second output end.

The electronic device 600 can implement processes implemented by the electronic device in the foregoing method embodiments. To avoid repetition, details are not described herein again.

The electronic device 600 in this embodiment of the present disclosure can connect a noise suppression component based on an operation of a user by controlling the switch, so that the noise suppression component meets a requirement of the operating mode of the speaker module, thereby avoiding mutual interference between the speaker module and the electronic device when the speaker module is in different operating modes.

Figure 7:
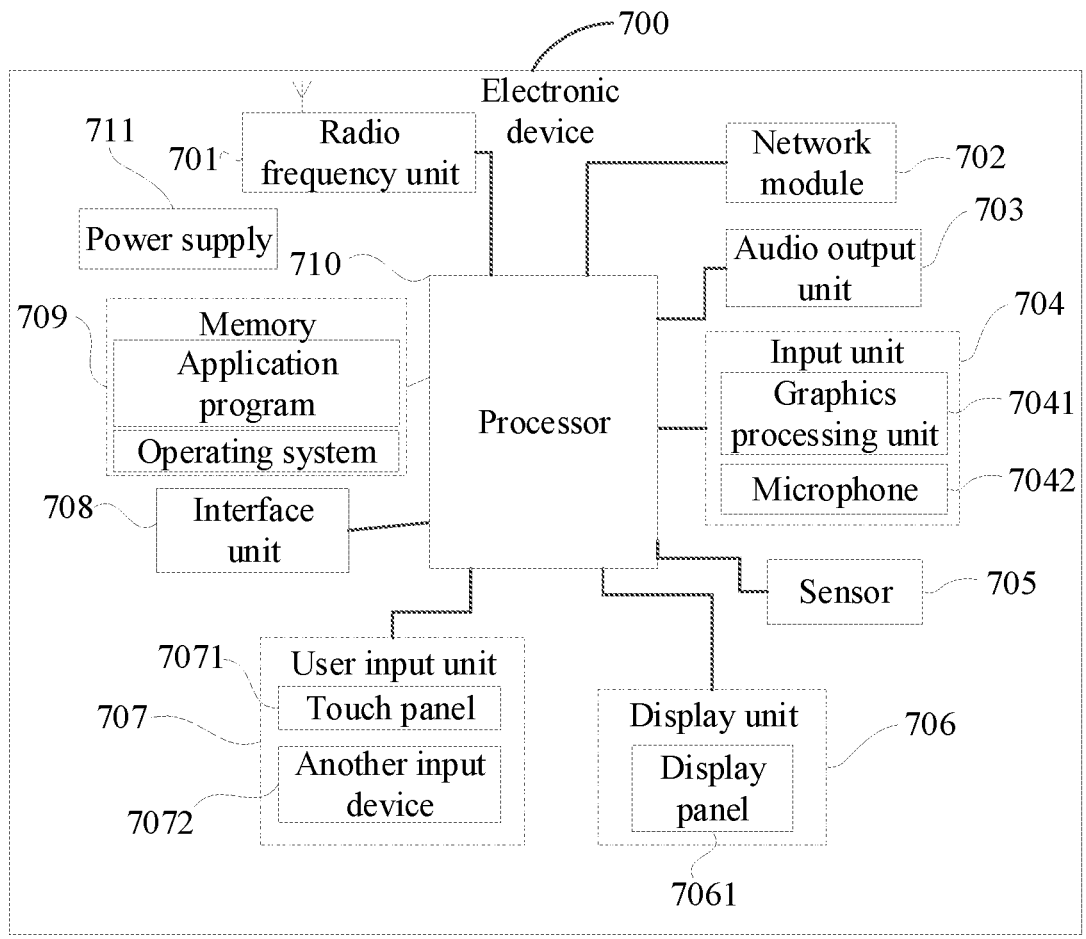
FIG. 7 is a second structural diagram of an electronic device according to an embodiment of the present disclosure.

FIG. 7 is a schematic diagram of a hardware structure of an electronic device for implementing embodiments of the present disclosure. The electronic device 700 includes but is not limited to components such as a radio frequency unit 701, a network module 702, an audio output unit 703, an input unit 704, a sensor 705, a display unit 706, a user input unit 707, an interface unit 708, a memory 709, a processor 710, and a power supply 711. A person skilled in the art may understand that a structure of the electronic device shown in FIG. 7 does not constitute a limitation on the electronic device, and the electronic device may include more or fewer components than those shown in the figure, or combine some components, or have different component arrangements. In this embodiment of the present disclosure, the electronic device includes but is not limited to a mobile phone, a tablet computer, a laptop computer, a palmtop computer, an in-vehicle mobile terminal, a wearable device, a pedometer, and the like.

The processor 710 is configured to: receive a first input; and in response to the first input, switch the speaker module to the receiver mode, and connect the input end of the switch to the first output end; or in response to the first input, switch the speaker module to the speaker mode, and connect the input end of the switch to the second output end.

In this way, a noise suppression component can be connected based on an operation of a user by controlling the switch, so that the noise suppression component meets a requirement of the operating mode of the speaker module, thereby avoiding mutual interference between the speaker module and the electronic device when the speaker module is in different operating modes.

It should be understood that, in this embodiment of the present disclosure, the radio frequency unit 701 may be configured to receive and send information or receive and send a signal in a call process. In some embodiments, after downlink data from a base station is received, the processor 710 processes the downlink data. In addition, uplink data is sent to the base station. Generally, the radio frequency unit 701 includes but is not limited to an antenna, at least one amplifier, a transceiver, a coupler, a low noise amplifier, a duplexer, and the like. In addition, the radio frequency unit 701 may further communicate with a network and another device by using a wireless communication system.

The electronic device provides wireless broadband Internet access for the user by using the network module 702, for example, helping the user send and receive an email, browse a web page, and access streaming media.

The audio output unit 703 may convert audio data received by the radio frequency unit 701 or the network module 702 or stored in the memory 709 into an audio signal and output as sound. In addition, the audio output unit 703 may further provide audio output (for example, call signal receiving sound or message receiving sound) related to a specific function performed by the electronic device 700. The audio output unit 703 includes a speaker, a buzzer, a telephone receiver, and the like.

The input unit 704 is configured to receive an audio or video signal. The input unit 704 may include a Graphics Processing Unit (GPU) 7041 and a microphone 7042. The graphics processing unit 7041 processes image data of a static picture or a video obtained by an image capture apparatus (such as a camera) in a video capture mode or an image capture mode. A processed image frame may be displayed on the display unit 706. The image frame processed by the graphics processing unit 7041 may be stored in the memory 709 (or another storage medium) or sent by using the radio frequency unit 701 or the network module 702. The microphone 7042 may receive sound and can process such sound into audio data. The processed audio data may be output by being converted into a format that may be sent to a mobile communications base station by using the radio frequency unit 701 in a telephone call mode.

The electronic device 700 further includes at least one sensor 705, such as an optional sensor, a motion sensor, and another sensor. In some embodiments, the optical sensor includes an ambient light sensor and a proximity sensor. The ambient light sensor may adjust luminance of a display panel 7061 based on brightness of ambient light, and the proximity sensor may disable the display panel 7061 and/or backlight when the electronic device 700 approaches an ear. As a type of the motion sensor, an accelerometer sensor may detect magnitude of an acceleration in each direction (generally three axes), and may detect magnitude and a direction of gravity when being static. The accelerometer sensor may be used for recognizing an electronic device gesture (for example, horizontal and vertical screen switching, a related game, or magnetometer posture calibration), a function related to vibration recognition (for example, a pedometer or a strike), or the like. The sensor 705 may further include a fingerprint sensor, a pressure sensor, an iris sensor, a molecular sensor, a gyroscope, a barometer, a hygrometer, a thermometer, an infrared sensor, and the like. This is not described herein.

The display unit 706 is configured to display information entered by the user or information provided for the user. The display unit 706 may include a display panel 7061, and the display panel 7061 may be configured in a form of a Liquid Crystal Display (LCD), an Organic Light-Emitting Diode (OLED), or the like.

The user input unit 707 may be configured to receive input digit or character information and generate key signal input related to user setting and function control of the electronic device. In some embodiments, the user input unit 707 includes a touch panel 7071 and another input device 7072. The touch panel 7071, also referred to as a touchscreen, may collect a touch operation performed by the user on or near the touch panel 7071 (for example, an operation performed by the user on or near the touch panel 7071 by using any suitable object or accessory such as a finger or a stylus). The touch panel 7071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, sends the contact coordinates to the processor 710, and can receive and execute a command sent by the processor 710. In addition, the touch panel 7071 may be implemented by using multiple types such as a resistive type, a capacitive type, an infrared ray, and a surface acoustic wave. The user input unit 707 may include another input device 7072 in addition to the touch panel 7071. In some embodiments, the another input device 7072 may include but is not limited to one or more of a physical keyboard, a function key (such as a volume control key or an on/off key), a trackball, a mouse, a joystick, and the like. Details are not described herein.

Further, the touch panel 7071 may cover the display panel 7061. After detecting the touch operation on or near the touch panel 7071, the touch panel 7071 transmits the touch operation to the processor 710 to determine a type of a touch event, and then the processor 710 provides corresponding visual output on the display panel 7061 based on the type of the touch event. In FIG. 7, the touch panel 7071 and the display panel 7061 are used as two independent components to implement input and output functions of the electronic device. However, in some embodiments, the touch panel 7071 and the display panel 7061 may be integrated to implement the input and output functions of the electronic device. This is not specifically limited herein.

The interface unit 708 is an interface connecting an external apparatus to the electronic device 700. For example, the external apparatus may include a wired or wireless headset port, an external power supply (or battery charger) port, a wired or wireless data port, a storage card port, a port configured to connect to an apparatus having an identification module, an audio Input/Output (I/O) port, a video I/O port, a headset port, and the like. The interface unit 708 may be configured to receive input (for example, data information and power) from the external apparatus and transmit the received input to one or more elements in the electronic device 700, or may be configured to transmit data between the electronic device 700 and the external apparatus.

The memory 709 may be configured to store a software program and various data. The memory 709 may mainly include a program storage area and a data storage area. The program storage area may store an operating system, an application program required by at least one function (such as a sound play function or an image play function), and the like. The data storage area may store data (such as audio data or an address book) or the like created based on use of the electronic device. In addition, the memory 709 may include a high-speed random access memory, and may further include a non-volatile memory such as at least one magnetic disk storage component, a flash memory component, or another volatile solid-state storage component.

The processor 710 is a control center of the electronic device, and is connected to all parts of the entire electronic device by using various interfaces and lines, and performs various functions of the electronic device and processes data by running or executing the software program and/or the module that are stored in the memory 709 and invoking the data stored in the memory 709, to implement overall monitoring on the electronic device. The processor 710 may include one or more processing units. In some embodiments, the processor 710 may be integrated with an application processor and a modem processor. The application processor mainly processes an operating system, a user interface, an application program, and the like, and the modem processor mainly processes wireless communication. It may be understood that the modem processor may also not be integrated into the processor 710.

The electronic device 700 may further include a power supply 711 (such as a battery) that supplies power to each component. In some embodiments, the power supply 711 may be logically connected to the processor 710 by using a power management system, to implement functions such as charging, discharging, and power consumption management by using the power management system.

In addition, the electronic device 700 includes some function modules not shown, and details are not described herein.

In some embodiments, an embodiment of the present disclosure further provides an electronic device, including a processor 710, a memory 709, and a computer program that is stored in the memory 709 and may run on the processor 710. When the computer program is executed by the processor 710, processes of the embodiment of the foregoing audio playing method can be implemented, and a same technical effect can be achieved. To avoid repetition, details are not described herein.

An embodiment of the present disclosure further provides a computer-readable storage medium. A computer program is stored in the computer-readable storage medium. When being executed by a processor, processes of the embodiment of the foregoing audio playing method can be implemented, and a same technical effect can be achieved. To avoid repetition, details are not described herein. The computer-readable storage medium includes a Read-Only Memory (ROM), a Random Access Memory (RAM), a magnetic disk, an optical disc, or the like.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In the absence of more restrictions, an element defined by the statement "including a . . . " does not exclude another same element in a process, method, article, or apparatus that includes the element.

According to the descriptions of the foregoing embodiments, a person skilled in the art may clearly understand that the foregoing method embodiments may be implemented by using software and a required universal hardware platform, or certainly may be implemented by using hardware. Based on such an understanding, the technical solutions of the present disclosure essentially or the part contributing to existing technologies may be implemented in a form of a software product. The computer software product is stored in a storage medium (such as a ROM/RAM, a magnetic disk, or an optical disc) and includes several instructions for instructing an electronic device (which may be a mobile phone, a computer, a server, an air conditioner, or a network device) to execute the methods described in the embodiments of the present disclosure.

The embodiments of the present disclosure are described with reference to the accompanying drawings. However, the present disclosure is not limited to the foregoing specific embodiments. The foregoing specific embodiments are merely examples, but are not limiting. A person of ordinary skill in the art may make many forms without departing from the objective and the scope of the claims of the present disclosure, and these forms all fall within the protection scope of the present disclosure.

The invention claimed is:

1. An audio playing apparatus, comprising:
a power amplifier;
a switch, wherein an input end of the switch is connected to the power amplifier;
a first noise suppression component and a second noise suppression component, wherein a first end of the first noise suppression component is connected to a first output end of the switch, and a first end of the second noise suppression component is connected to a second output end of the switch; and
a speaker, connected to a second end of the first noise suppression component and a second end of the second noise suppression component, wherein the speaker has a receiver mode and a speaker mode; wherein
at least one of the first noise suppression component and the second noise suppression component comprises two sub-components, wherein one of the two sub-components is connected between the input end of the switch and the speaker, and the other one of the two sub-components is connected between the corresponding output end of the switch and the speaker, and the speaker is switched between the receiver mode and the speaker mode when the input end of the switch is connected to the first output end of the switch or the second output end of the switch.

2. The audio playing apparatus according to claim 1, wherein an impedance of the first noise suppression component is greater than or equal to a preset impedance value, and an overcurrent capability of the first noise suppression component is less than a preset current value; and
an impedance of the second noise suppression component is less than the preset impedance value, and an overcurrent capability of the second noise suppression component is greater than or equal to the preset current value.

3. The audio playing apparatus according to claim 2, wherein the first noise suppression component comprises a first noise suppression sub-component and a second noise suppression sub-component, a first end of the first noise suppression sub-component is connected to the first output end of the switch, a second end of the first noise suppression sub-component is connected to a positive electrode of the speaker, a first end of the second noise suppression sub-component is connected to the input end of the switch, and a second end of the second noise suppression sub-component is connected to a negative electrode of the speaker.

4. The audio playing apparatus according to claim 2, wherein the second noise suppression component comprises a third noise suppression sub-component and a fourth noise suppression sub-component, a first end of the third noise suppression sub-component is connected to the second output end of the switch, a second end of the third noise suppression sub-component is connected to the positive electrode of the speaker, a first end of the fourth noise suppression sub-component is connected to the input end of the switch, and a second end of the fourth noise suppression sub-component is connected to the negative electrode of the speaker.

5. An audio playing method, performed by an electronic device, and the method comprises:
receiving a first input; and
in response to the first input, switching a speaker to a receiver mode, by connecting an input end of a switch to a first output end, wherein the speaker is connected to the first output end of the switch through a first noise suppression circuit; or
in response to the first input, switching the speaker to a speaker mode, and connecting the input end of the switch to a second output end, wherein the speaker is connected to the second output end of the switch through a second noise suppression circuit,
wherein at least one of the first noise suppression component and the second noise suppression component comprises two sub-components, wherein one of the two sub-components is connected between the input end of the switch and the speaker, and the other one of the two sub-components is connected between the corresponding output end of the switch and the speaker.

6. An electronic device, comprising:
a memory storing computer-readable instructions; and
a processor coupled to the memory and configured to execute the computer-readable instructions, wherein the computer-readable instructions, when executed by the processor, cause the processor to perform the operations comprising:
receiving a first input; and
in response to the first input, switching a speaker to a receiver mode, by connecting an input end of a switch to a first output end, wherein the speaker is connected to the first output end of the switch through a first noise suppression circuit; or in response to the first input, switching the speaker to a speaker mode, and connecting the input end of the switch to a second output end, wherein the speaker is connected to the second output end of the switch through a second noise suppression circuit, wherein at least one of the first noise suppression component and the second noise suppression component comprises two sub-components, wherein one of the two sub-components is connected between the input end of the switch and the speaker, and the other one of the two sub-components is connected between the corresponding output end of the switch and the speaker.

7. The audio playing apparatus according to claim 1, wherein when the speaker is in the receiver mode, the input end of the switch is connected to the first output end of the switch, and an operating parameter of the first noise suppression component matches a first output current of the power amplifier; or when the speaker is in the speaker mode, the input end of the switch is connected to the second output end of the switch, and an operating parameter of the second noise suppression component matches a second output current of the power amplifier.

\* \* \* \* \*